(12) United States Patent
Sauder et al.

(10) Patent No.: US 7,086,269 B2
(45) Date of Patent: Aug. 8, 2006

(54) APPARATUS AND METHOD FOR TESTING SEED SINGULATION OF A SEED METER

(75) Inventors: Gregg A. Sauder, Tremont, IL (US); Chad E. Plattner, Tremont, IL (US); Derek A. Sauder, Tremont, IL (US); Don L. Dunlap, Pekin, IL (US)

(73) Assignee: Precision Planting, Inc., Tremont, IL (US)

(*) Notice: Subject to any disclaimer, the term of this patent is extended or adjusted under 35 U.S.C. 154(b) by 67 days.

(21) Appl. No.: 10/891,890

(22) Filed: Jul. 15, 2004

(65) Prior Publication Data

US 2006/0011647 A1 Jan. 19, 2006

(51) Int. Cl.
*G01D 18/00* (2006.01)
*G01N 19/00* (2006.01)

(52) U.S. Cl. .................................. 73/1.01; 73/865.9
(58) Field of Classification Search .............. 73/1.01, 73/865.9; 250/222.1, 222.2, 223 R
See application file for complete search history.

(56) References Cited

U.S. PATENT DOCUMENTS

| | | | |
|---|---|---|---|
| 3,552,601 A | 1/1971 | Hansen et al. ............. 221/219 |
| 3,912,121 A * | 10/1975 | Steffen ......................... 221/13 |
| 3,990,606 A | 11/1976 | Gugenhan .................. 221/211 |
| 4,351,437 A * | 9/1982 | Long ........................... 209/545 |
| 4,450,979 A | 5/1984 | Deckler ...................... 221/263 |
| 5,170,909 A | 12/1992 | Lundie et al. .............. 221/211 |
| 5,635,911 A * | 6/1997 | Landers et al. ............. 340/674 |
| 5,720,233 A | 2/1998 | Lodico et al. .............. 111/184 |
| 5,938,071 A | 8/1999 | Sauder ....................... 221/211 |
| 5,969,340 A * | 10/1999 | Dragne et al. ........... 250/223 R |
| 5,992,338 A | 11/1999 | Romans ...................... 111/171 |

* cited by examiner

*Primary Examiner*—Charles Garber
(74) *Attorney, Agent, or Firm*—Larkin Hoffman Daly & Lindgren Ltd.; Thomas J. Oppold

(57) ABSTRACT

An apparatus and method of testing seed singulation of a seed meter. The apparatus includes a frame which supports the seed meter to be tested above a track within which is disposed a continuous flighted belt. A drive system is provided to drive the flighted belt and the seed meter at a preselected speed and seed discharge rate, respectively. In operation, seeds supplied to the seed meter are dispensed by the seed meter in its normal mode of operation onto the moving flighted belt. A sensor disposed along the path of travel of the belt detects the seeds within each passing cell. A computer records and registers data relevant to the singulation accuracy and efficiency of the seed meter.

26 Claims, 12 Drawing Sheets

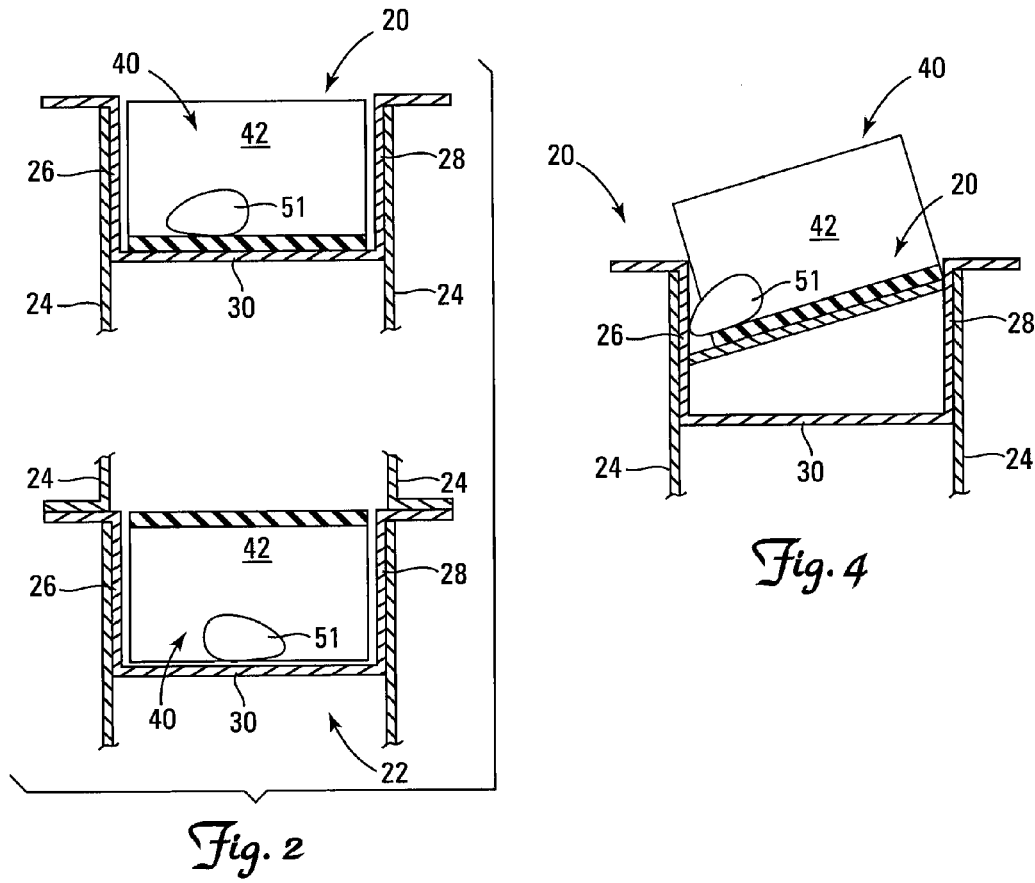
Fig. 2
Fig. 4
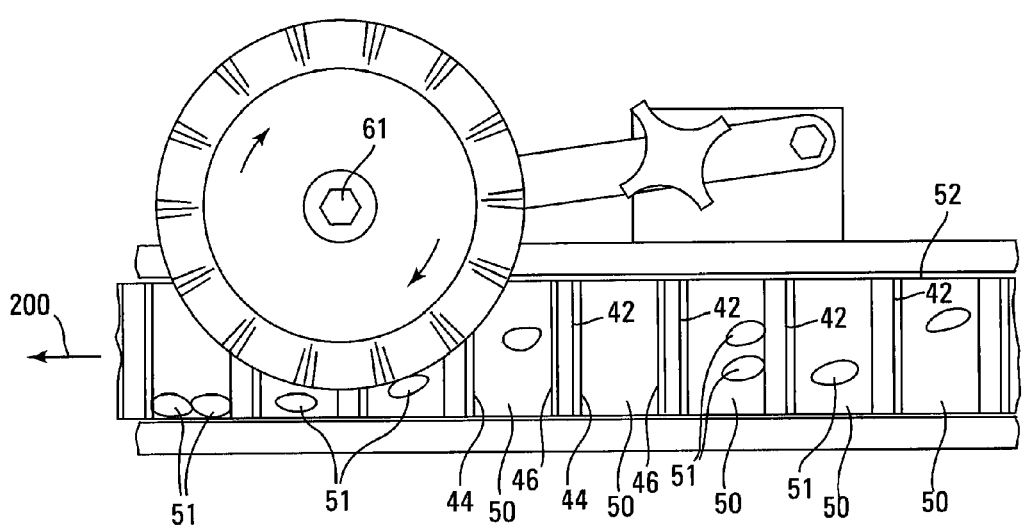
Fig. 3

APPARATUS AND METHOD FOR TESTING SEED SINGULATION OF A SEED METER

BACKGROUND OF THE INVENTION

It is well recognized that proper and uniform seed spacing in the furrow is essential to maximizing crop yield. In order to achieve this proper and uniform seed spacing in the furrow, virtually all commercially available seed meters for row-crop planters are designed to singulate seeds, i.e., to dispense individuals seeds at regular intervals.

Presently, commercially available seed meters can generally be divided into two categories on the basis of the seed selection mechanism employed, namely, mechanical or pneumatic. The most common commercially available mechanical meters include finger-pickup meters such as disclosed in U.S. Pat. No. 3,552,601 to Hansen ("Hansen '601"), cavity-disc meters such as disclosed in U.S. Pat. No. 5,720,233 to Lodico et al. ("Lodico '233"), and belt meters such as disclosed in U.S. Pat. No. 5,992,338 to Romans ("Romans '338"). The most common commercially available pneumatic meters include vacuum-disc meters such as disclosed in U.S. Pat. No. 3,990,606 to Gegenhan ("Gugenhan '606") and in U.S. Pat. No. 5,170,909 to Lundie et al. ("Lundie '909") and positive-air meters such as disclosed in U.S. Pat. No. 4,450,979 to Deckler ("Deckler '979").

As with all equipment, the parts of a seed meter will eventually wear over time. Worn parts may effect the seed meter's ability to uniformly singulate the seeds. For example, due to worn parts, the seed meter may fail to consistently dispense seeds at regular intervals, thereby resulting in seed "skips." Alternatively, the worn parts may occasionally cause two or even three seeds to be dispensed at one time, resulting in seed "doubles" or seed "triples," respectively. Such seed multiples, as with seed skips, will effect the uniformity of seed spacing in the furrow and ultimately decrease crop yield.

In addition to worn parts, planter speed, seed population, different seed sizes, and different seed shapes will effect the ability of a seed meter to uniformity dispense individual seeds at regular intervals. As such, successful farmers recognize that they must not only regularly inspect and replace worn parts of their seed meters, they must also calibrate or adjust their seed meters depending on the desired or target seed population and the seed type and/or seed variety to be planted. For example, when switching between different seed types or seed varieties, the seeds may vary in size from small to large and the seeds may vary in shape from round to flat, etc. While a seed meter may be perfectly adjusted to singulate small round seeds at a desired seed population, upon switching to a large round or large flat seed variety, the seed selection mechanism may not be able to consistently select the larger seeds, resulting in excessive seed skips. As a further example, when increasing seed population, the higher rotational speeds of the seed meter's seed selection mechanism may prevent consistent seed selection and/or seed retention, thereby also resulting in excessive seed skips. As a further example, the seed meter's brushes or seed strippers may be set too aggressively for larger seeds or the increased rotation speed of the seed selection mechanism, also resulting in excessive skips. In yet a further example, upon switching to small flat seed variety, the seed selection mechanism may select and retain multiple seeds and the meter's brushes or strippers may not be set aggressively enough to consistently remove or strip the excess seeds from the selection mechanism, thereby resulting in excessive seed multiples being dispensed by the meter.

Accordingly, it should be appreciated that there is a need for an apparatus and method for testing a seed meter's ability to singulate seeds whereby a farmer can use such test results to properly calibrate or adjust the meter to minimize seed skips or seed multiples when planting a particular variety of seed at a desired or target seed population. The seed meter testing apparatus disclosed in U.S. Pat. 5,938,071 to Sauder (the "Sauder '071 patent) is directed toward such an apparatus and method. The Sauder '071 patent is hereby incorporated herein by reference.

As disclosed in the '071 patent, a seed meter desired to be tested is removed from the planter and mounted to the testing apparatus. In operation, the variable speed motor is engaged to operably drive the flighted belt and to operably drive the seed meter's seed selection mechanism at the desired rotational speed to achieve the desired or target seed population or seed discharge rate. The seeds with which the meter is desired to be tested is supplied to the seed meter by an operator. The seed meter dispenses the seeds in its normal mode of operation onto the moving flighted belt. After a predetermined number cells of the flighted belt pass (which directly corresponds to the target seed population), the belt and the meter are stopped and the seeds on the belt are counted. If the seed meter is properly adjusted or calibrated and operating properly, the number of seeds actually dispensed on the belt should equal the target seed population. In addition, the operator can count the number of skips (i.e., empty cells) and multiples (i.e., cells containing more than one seed) to determine the number or "errors" in that "run" of cells. From this error count, the operator can then easily calculate the accuracy of the seed meter's performance in terms of percent singulation, i.e., the number of instances in which an error occurred in a run divided by the number of cells in that run and multiplying the quotient by 100. Other relevant statistical data can also be calculated based on the error count and known number of cells comprising a run, including the percentage of skips in the run, the percentage of multiples in the run, etc. This process is generally repeated two or more times to obtain a more accurate average error percentage for the meter being tested. If the error percentage is deemed excessive, appropriate adjustments can be made to the seed meter, as recognized by those skilled in the art depending on the seed meter type. This testing and adjustment process is repeated until the meter is properly calibrated to dispense seeds at the desired seed population and to singulate the seeds within acceptable error percentages for the particular seed variety and seed population desired.

While the apparatus and method disclosed in the Sauder '071 patent effectively meet and satisfactorily serve the purposes and the functions for which they are intended, a more efficient apparatus and method of testing a seed meter is desired that does not require the operator to stop the belt to identify the meter's accuracy and singulation efficiency. Accordingly, it is desired to provide an apparatus and method for testing seed meters that offers the features and advantages of the apparatus disclosed in the Sauder '071 patent, but which is more efficient in operation by automating the seed count and error detection operations without having to stop the belt, and by displaying to the operator other desired or relevant information about the accuracy of operation and efficiency of the seed meter being tested.

SUMMARY OF THE INVENTION

An apparatus and method of testing seed singulation of a seed meter. The apparatus includes a frame which supports the seed meter to be tested above a track within which is disposed a continuous flighted belt. A drive system is provided to drive the flighted belt and the seed meter at a preselected speed and seed discharge rate, respectively. In operation, seeds supplied to the seed meter are dispensed by the seed meter in its normal mode of operation onto the moving flighted belt. A sensor disposed along the path of travel of the belt detects the seeds within each passing cell. A computer records and registers data relevant to the singulation accuracy and efficiency of the seed meter. The particular data recorded and registered on the computer is preferably definable by the operator based on preprogrammed modes of operation corresponding to the particular type meter being tested, including mechanical and pneumatic meters.

BRIEF DESCRIPTION OF THE DRAWINGS

Other objects, advantages, and novel features of the present invention will become apparent from the following detailed description of the invention when considered in conjunction with the accompanying drawings, wherein:

FIG. 2 is a cross-sectional view of the preferred embodiment of the track and belt comprising the apparatus of FIG. 1 as viewed along lines 2—2 of FIG. 1.

FIG. 3 is a top view of a portion of the track and belt comprising the apparatus of FIG. 1 and showing the preferred embodiment of the seed aligning assembly.

FIG. 4 is a cross-sectional view of the preferred embodiment of the track and belt comprising the apparatus of FIG. 1 as viewed along lines 4—4 of FIG. 1.

DETAILED DESCRIPTION OF THE INVENTION

Figure 1:
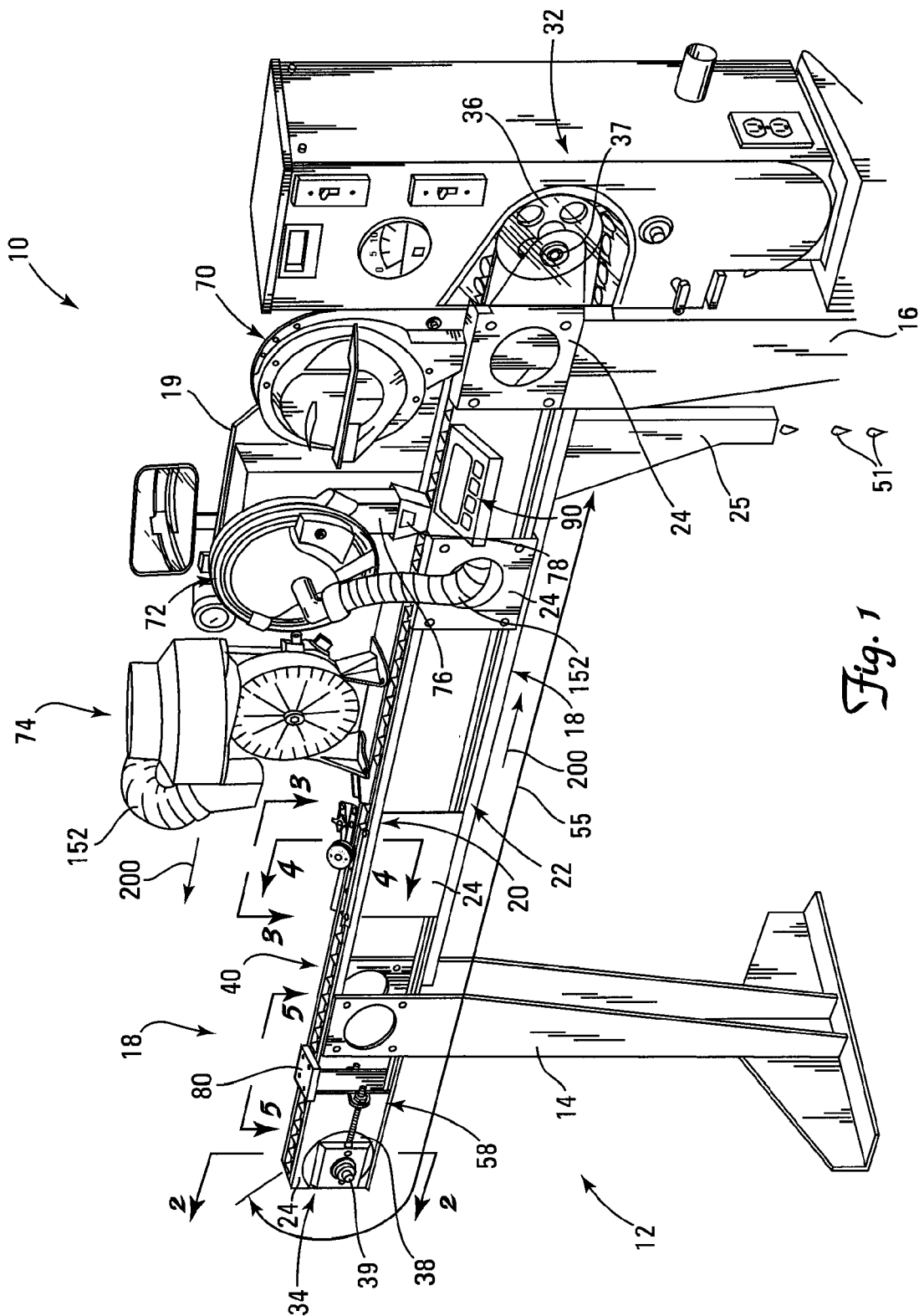
FIG. 1 is a foreshortened perspective view of a preferred embodiment of the seed meter testing apparatus of the present invention.

Referring now to the drawings, wherein like reference numerals designate identical or corresponding parts throughout the several views, FIG. 1 shows a preferred embodiment of the seed meter testing apparatus 10 of the present invention.

In the preferred embodiment, the apparatus 10, comprises a frame 12 having support legs 14, 16 which support an elongated track 18 at a convenient height above the floor surface. The frame 12 further includes a seed meter mount 19 to support one or more seed meters to be tested (discussed below). The preferred track 18, includes opposing, upper and lower channels 20, 22, vertically spaced apart in fixed relation by gussets 24. Each channel 20, 22 when viewed in cross-section, as illustrated in FIG. 2, includes opposing side flanges 26, 28 spaced by a web 30. Referring again to FIG. 1, at the fore and aft ends 32, 34 of the track 18 is a drive pulley 36, and an idler pulley 38, respectively. Each of the pulleys 36, 38 are preferably removably fixed to a shaft 37, 39 rotatably supported by the gussets 24 equidistant between the vertically opposing upper and lower channels 20, 22. A continuous belt 40 is disposed between the vertical side flanges 26, 28 of the upper and lower channels 20, 22 of the track 18 and around the pulleys 36, 38 at the fore and aft ends 32, 34 of the track 18.

The apparatus 10 of the present invention is preferably able to test any type of seed meter that is capable of being used on a conventional row-crop or drill planter, including both mechanical, pneumatic and combination meters as previously described. The apparatus 10 of the present invention, by way of example only, is described herein and shown in the drawing figures as simultaneously supporting three different types of seed meters, including a finger-pickup type meter 70 such as disclosed in the Hansen '601 patent, a vacuum-disc meter 72 such as disclosed in the Lundie '909 patent or the Gugenhan '606 patent, and a positive-air meter 74 such as disclosed in the Deckler '979 patent.

It should be appreciated that the apparatus 10 may support more or fewer meters of any type. Depending the height above the belt 40 that seeds are discharged from the meter, it may be necessary to provide a tube 76 to direct or guide seeds onto the belt 40 after being discharged by the meter, for example, as shown in FIG. 1 for the meter 72. Accordingly, the apparatus 10 of the present invention should not be construed as being limited to supporting any number or type of meters in a particular manner, it only being necessary to the functional operation of the apparatus 10 that at least one meter to be tested is supported in some manner to operably dispense seeds onto the belt 40.

As illustrated in FIGS. 2–6, the continuous belt 40 preferably includes a plurality of equidistantly spaced ears or flights 42, wherein adjacently disposed flights 42 define the leading and trailing ends 44, 46 of a cavity or cell 50. As best viewed in FIG. 3, which is a partial top plan view of the belt 40 disposed in the upper channel 20 of the track 18, the vertical side flanges 26, 28 of the upper and lower channels 20, 22 define the sides 52, 54 of the cell 50 into which seeds 51 are dispensed by the seed meter 70, 72, 74 being tested. Preferably, as best viewed in FIG. 2, which is a cross-sectional view of the track 18 as viewed along lines 2—2 of FIG. 1, the lower channel 22 of the track 18 is enclosed from the upper quadrant of the idler pulley 38 to the seed discharge funnel 25 as indicated by arrow 55 (FIG. 1). When the seeds reach the funnel 25, the seeds fall by gravity through the funnel 25 where they can be collected into a pan or bucket (not shown). It should be appreciated that without the bottom plate 56, the seeds would otherwise fall from the cells 50 as the belt 40 rotated past the idler pulley 38. By providing the bottom plate 56 and funnel 25 the seeds can be collected near the operator and the seed meter being tested, thereby allowing the operator ready access to a seed pool to continue each test run as opposed to being discharged at the aft end of the track away from the operator.

The tension of the belt 40 about the track 18 is preferably adjustable by a belt tension assembly 58, wherein a nut 57 is loosened or tightened on a threaded rod 59 to operably move the rotatable shaft 39 supporting the idler pulley 38 to move longitudinally toward or away from the upper and lower channels 20, 22 of the track, and in lateral alignment therewith, thereby loosening or tightening the belt 40. Obviously, other suitable means of adjusting the tension in a belt may be utilized as recognized by those skilled in the art. A more detailed description of the belt tensioning assembly is provided in the Sauder '071 patent previously identified and incorporated herein.

Referring now to FIG. 4, which is a cross-sectional view of the upper channel 20 of the track 18 as viewed along lines 4—4 of FIG. 1, it is preferred that the belt 40 is canted or sloped for a distance along the upper channel 20 of the track 18 such that one side of the belt is higher than the other side of the belt. This sloped or canted portion of the belt 40 will cause the seed 51 disposed in the cell 50 to roll or slide to the lower side 54 of the cell 50 so the seeds are aligned and disposed in close proximity to the preferred seed sensor 82 (discussed later) for improved accuracy in detecting the passing seeds. In addition, as best illustrated in FIG. 3, a seed aligning brush 60 is preferably mounted to sweep the seeds 51 within the cells 50 into longitudinal alignment along one side 54 of the belt 40 such that in the event of seed multiples within a cell, one seed is not transversely aligned or stacked such that it is in the "shadow" of another seed, thereby avoiding detection and effecting the accuracy of the seed count. As shown in FIG. 3, the bristles of the seed aligning brush 60 preferably extend into the cell 50 so that in operation, as the flights 42 engage the bristles as the flights 42 move in the direction of travel of arrow 200, the brush 60 rotates about a pin or shaft 61 thereby sweeping the seed 51 to the opposite side 54 of the cell 50. Obviously, other suitable means of aligning seeds to one side of the belt may be utilized as recognized by those skilled in the art. Therefore, the present invention should not be construed as being limited to any particular seed aligning mechanism or system. Additionally, it should be appreciated that, depending on the seed sensor used, it may not be necessary or even desirable to align the seeds along one side of the belt. Therefore, the present invention should not be deemed as being limited to employing any particular type of seed aligning mechanism or system, or for that matter, employing any seed aligning mechanism or system whatsoever.

Figure 5:
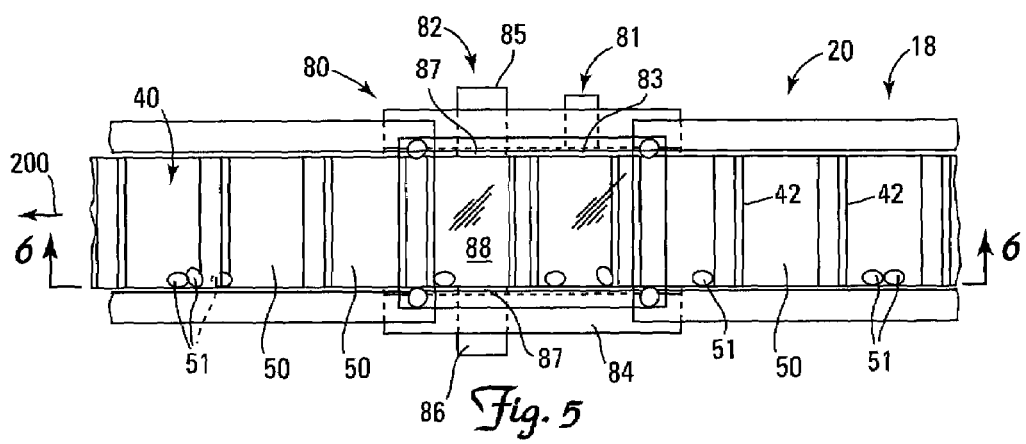
FIG. 5 is a top view of a portion of the track and belt and showing the preferred arrangement of the flight sensor and seed sensor comprising the apparatus of FIG. 1.
Figure 6:
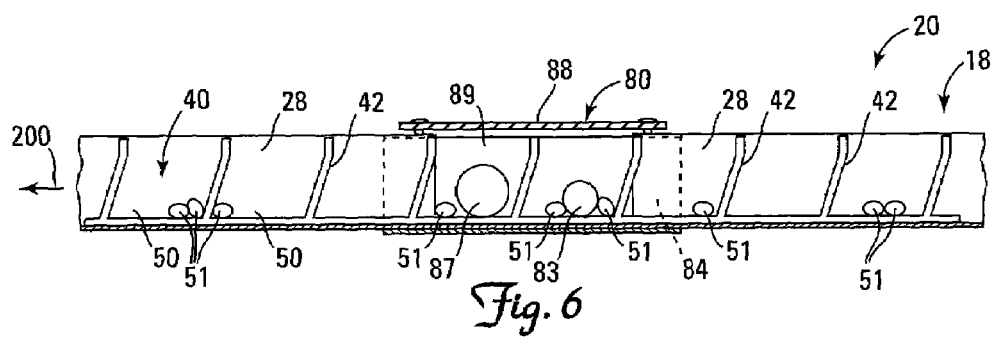
FIG. 6 is a cross-sectional view of the portion of the track and belt and showing the preferred arrangement of the flight sensor and seed sensor comprising the apparatus as viewed along 6—6 of FIG. 5.

As illustrated in FIG. 1, disposed along the path of travel of the belt 40 and downstream of the preferred canted portion of the belt 40 and the preferred seed aligning brush 60, is a sensor assembly 80. FIG. 5 is a detailed view of a the portion of the track 18 as viewed along lines 5—5 of FIG. 1, illustrating the preferred embodiment of the sensor assembly 80. FIG. 6 is a cross-sectional view of the upper channel 20 as viewed along lines 6—6 of FIG. 5. As illustrated in FIGS. 5 and 6, the preferred embodiment of the sensor assembly 80 comprises a channel 84 which supports a flight sensor 81 and a seed sensor 82. The distance between the flight sensor 81 and the seed sensor 82 is preferably substantially equal to the distance between flights 42 on the belt 40. The preferred flight sensor 81 is a photocell which generates an electrical pulse signal upon the passing of the flights 42 of the belt 40 past the aperture the port 83 in the sidewall 89 of the channel 84. Disposed downstream of the flight sensor 81 is the seed sensor 82. The preferred seed sensor 82 is a photoelectric sensor having an emitter 85 and a receiver 86 each disposed over ports 87 on opposite side walls 89 of the channel 84. When the seed 51 passes between the emitter 85 and receiver 86 the beam between the emitter and receiver is broken thereby generating an electrical pulse signal indicating the presence of a seed 51 in the cell 50. A clear top plate 88 is preferably disposed over the sensors 81, 82 to protect the sensors and minimize "noise" or errant debris that may effect the performance of the sensors.

Figure 7:
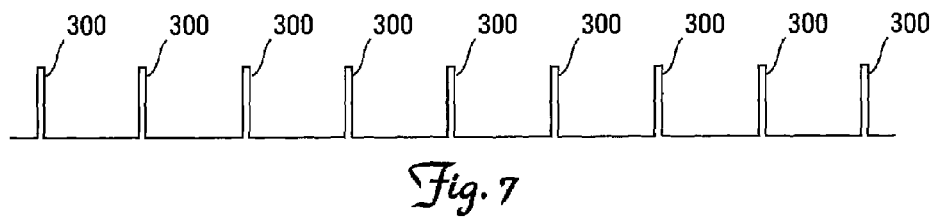
FIG. 7 is an example of the flight sensor signal pulses corresponding to the flights of the belt illustrated in FIG. 6.
Figure 8:
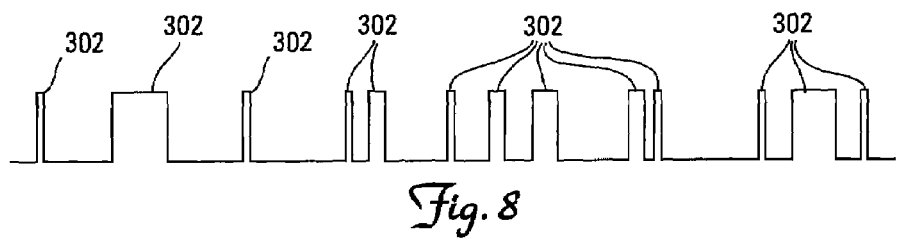
FIG. 8 is an example of the seed sensor signal pulses corresponding to the flights of the belt illustrated in FIG. 6.

Continuing to refer to FIGS. 5 and 6, various seed combinations, including singles, skips and multiples are shown in the cells 50 of the belt 40. As discussed in more detail later, FIG. 7 illustrates the substantially uniform flight sensor pulse signals 300 of the flight sensor 81 generated upon the passing of the respective flights 42 of the belt 40 illustrated in FIG. 6 past the flight sensor 81. FIG. 8 illustrates the different seed sensor pulse signals 302 generated upon the passing of the respective flights 42 and seeds 51 disposed within the cells 50 illustrated in FIG. 6 past the seed sensor 82.

Figure 14:
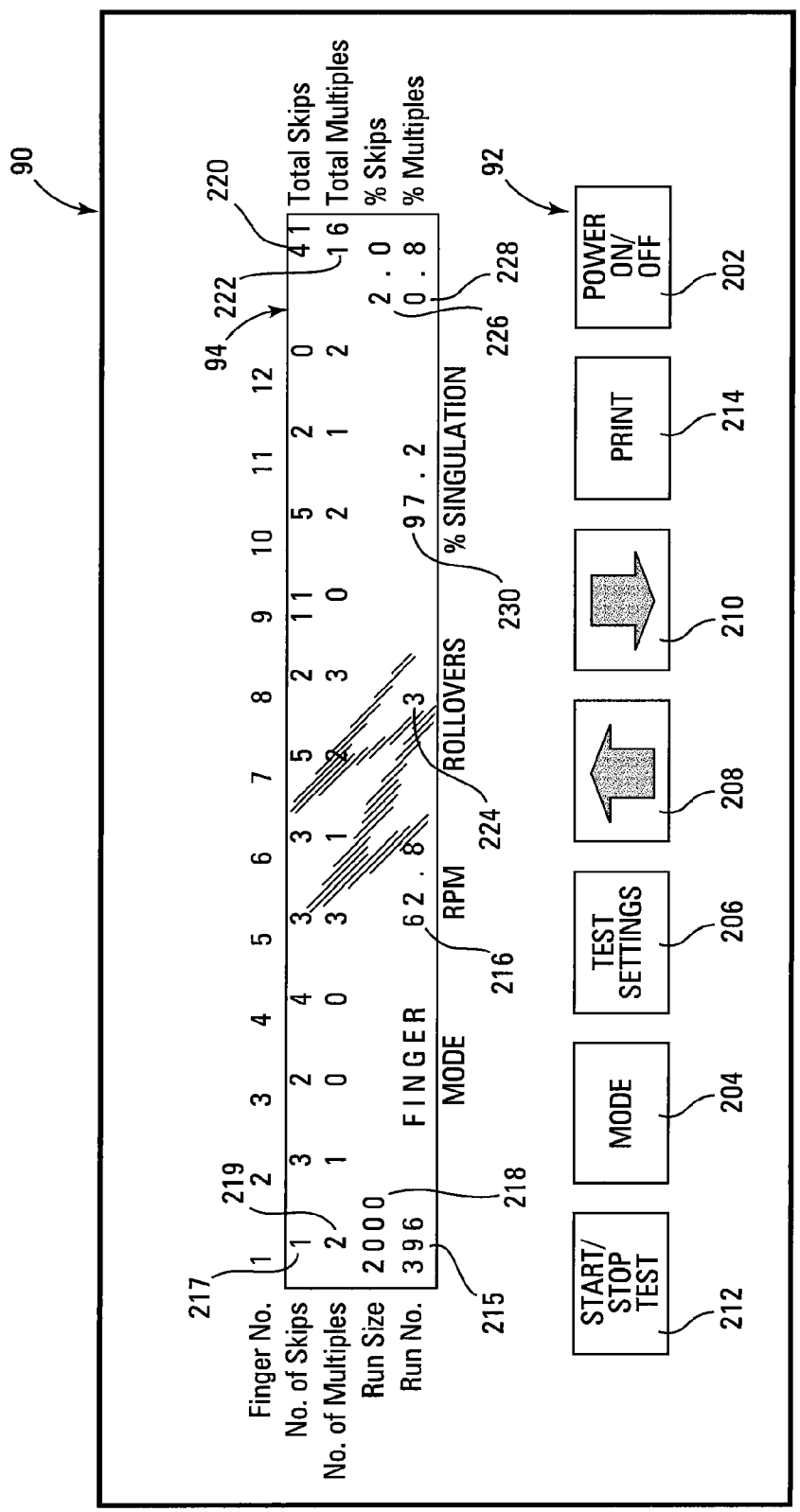
FIG. 14 is a top plan view of the preferred computer showing the preferred display and sample data in Finger Mode.

The sensors 81, 82 are preferably electrically connected to a computer 90 for receiving and processing the pulse signals 300, 302 generated by the sensors 81, 82. As shown in FIG. 1, the computer 90 is preferably supported on the frame 12 of the apparatus 10. The computer 90 preferably includes a programmable microprocessor, memory, a user interface 92 (FIG. 14) such as a push-button keypad, and a display 94 (FIG. 14). Those skilled in the art will readily appreciate that various different seed sensors and/or flight sensors may be used to detect the passing of a flight 42 and/or the passing of a seed 51 on the belt and therefore the present invention should not be limited to any particular type or combination of sensors or any particular type, arrangement or configuration of pulse signals 300, 302 generated by the sensors 81, 82. For example, one sensor, alone or in combination with other hardware or software, may be able to perform both functions of detecting seed on the belt and the passing of the cells 50.

Figure 9:
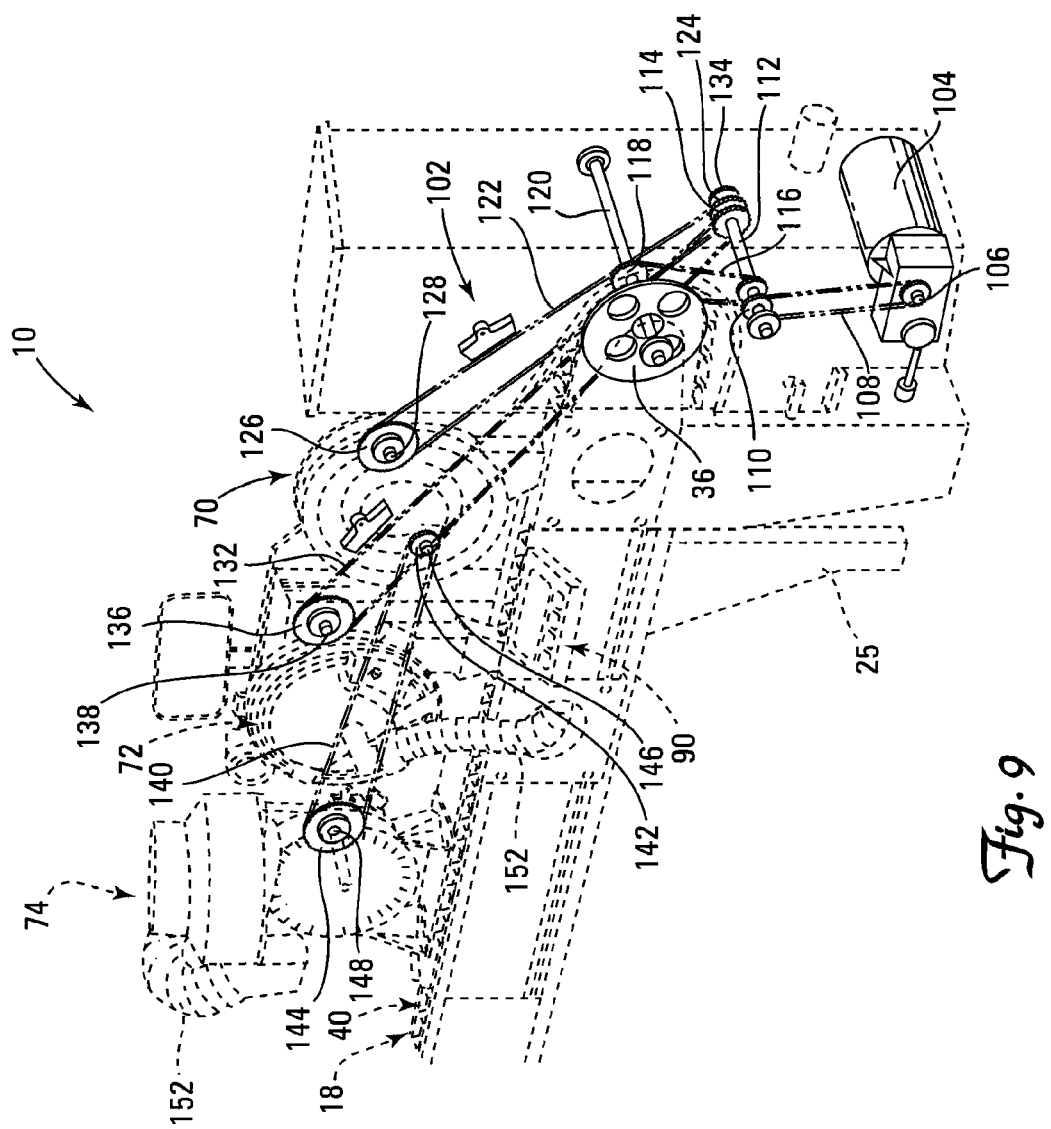
FIG. 9 is a perspective view of a preferred embodiment of the drive system comprising the apparatus of FIG. 1.

Referring to FIG. 9, the preferred embodiment of the seed meter testing apparatus 10 of the present invention further includes a drive system 102 for driving the belt 40 and one or more seed meters 70, 72, 74. In FIG. 9, the frame 12 and seed meters 70, 72, 74 are shown in hidden lines so the preferred drive system 102 is more clearly identified. As illustrated, the preferred drive system 102 preferably comprises a variable speed electric motor 104. The motor 104 operably drives a first sprocket 106. A first chain 108 couples the first sprocket 106 to second sprocket 110 preferably removably fixed to a first rotateable shaft 112. A third sprocket 114 is also preferably coaxially removably fixed to the first rotatable shaft 112. A second chain 116 couples the third sprocket 114 to a fourth sprocket 118 which is also preferably removably fixed to a second rotatable shaft 120. The drive pulley 36 is preferably coaxially removably fixed to the second rotatable shaft 120. Thus, it should be appreciated that the rotation of the first sprocket 106 by the motor 104 operably causes rotation of the drive pulley 36, and thus movement of the belt 40 in the direction of arrow 200.

The preferred drive system 102 also operably rotatably drives the seed meter 70, 72, 74 to be tested. In the preferred embodiment, the first meter 70 is preferably driven by a third chain 122 which couples a fifth and sixth sprocket 124, 126. The fifth sprocket 124 is preferably coaxially removably fixed to the second rotateable shaft 120 and the sixth sprocket 126 is preferably removably fixed to a third rotateable shaft 128 supported by the meter mount 19. The third rotatable shaft 128 preferably operably couples with the driven shaft 70-4 (FIG. 10) of seed meter 70 to cause rotation of the seed meter's seed selection mechanism 70-2 as described in detail later. The third rotatable shaft 128 preferably includes a lug or pin 130 (FIG. 10), the purpose of which will also be discussed in detail later.

In the preferred embodiment of the apparatus 10 of the present invention, the second meter 72 is also preferably driven by a sprocket and chain assembly. In the preferred embodiment, a fourth chain 132 couples a seventh and eighth sprocket 134, 136. The seventh sprocket 134 is preferably coaxially removably fixed to the second rotateable shaft 120 and the eighth sprocket 136 is preferably removably fixed to a fourth rotateable shaft 138 supported by the mount 19. The fourth rotatable shaft 138 couples with the driven shaft 72-4 (FIG. 11) of seed meter 72 to cause rotation of the seed meter's seed selection mechanism 72-2 as described in detail later.

In the preferred embodiment of the apparatus 10 of the present invention, the third meter 74 is also preferably driven by a sprocket and chain assembly. In the preferred embodiment, a fifth chain 140 couples a ninth and tenth sprocket 142, 144. The ninth sprocket 142 is preferably coaxially removably fixed to a fifth shaft 146 supported by the mount 19 and preferably driven by the fourth chain 132. The tenth sprocket 144 is preferably removably fixed to a sixth rotateable shaft 148 supported by the mount 19. The sixth rotatable shaft 148 couples with the driven shaft 74-4 (FIG. 12) of seed meter 74 to cause rotation of the seed meter's seed selection mechanism 74-2 as described in detail later.

Those skilled in the art will readily appreciate that there are various ways to drive the seed meters 70, 72, 74 and belt 40 and therefore the specific embodiment described herein should not be construed as limiting the scope of the apparatus 10 of the present invention to any specific type of drive system 102. For example, minor modifications or changes as recognized by those skilled in the art may be required to the drive assembly 102 depending on the number of seed meters to be supported on the frame 12 and/or the type of meters to be tested and/or the manner of coupling the seed meter's drive shaft to the drive system 102 and/or depending on the type of meter and the position of the meter when mounted to the frame 12. Similarly, it should be appreciated that rather than the belt and meters being driven by the same motor, the meters may be driven independently of the belt by separate motors. In yet a further example, rather than a sprocket and chain drive system, the drive system 102 could comprise a plurality of electric motors controlled by the operator manually or through the computer 90. Accordingly, the apparatus 10 of the present invention should not be construed as being limited to any particular type of drive system 102.

The following describes the general operation of the preferred test stand apparatus 10 for testing a seed meter (whether a finger-pickup meter 70, a vacuum-disc meter 72 or a positive-air meter 74).

Figure 10:
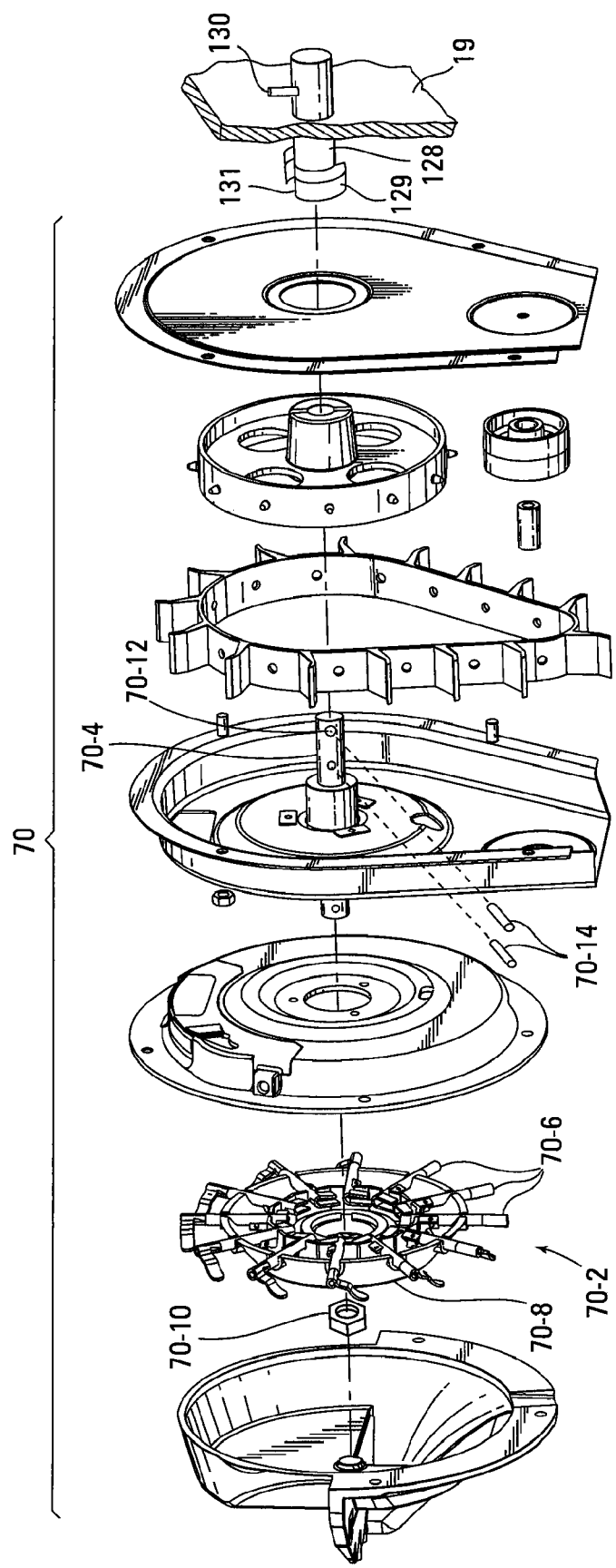
FIG. 10 is an exploded perspective view of a typical finger-pickup seed meter showing how the meter is operably coupled to the preferred drive system of the apparatus of FIG. 1.
Figure 11:
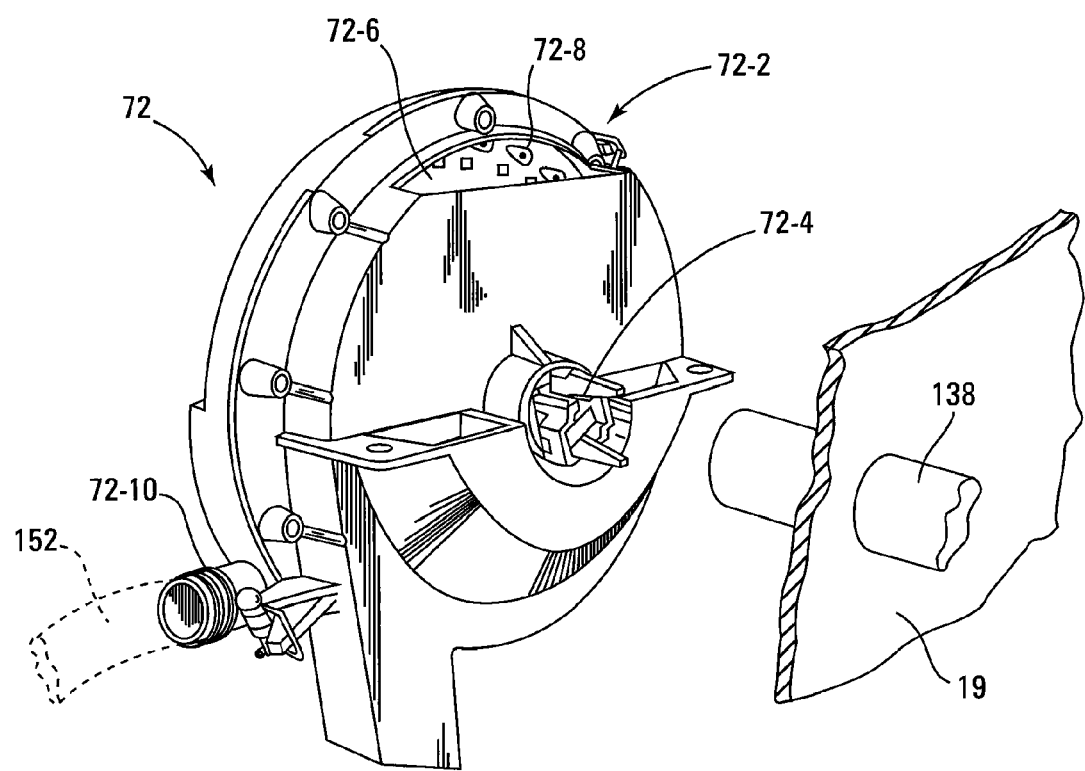
FIG. 11 is a perspective view of a typical vacuum disc seed meter showing how the meter is operably coupled to the preferred drive system of the apparatus of FIG. 1.
Figure 12:
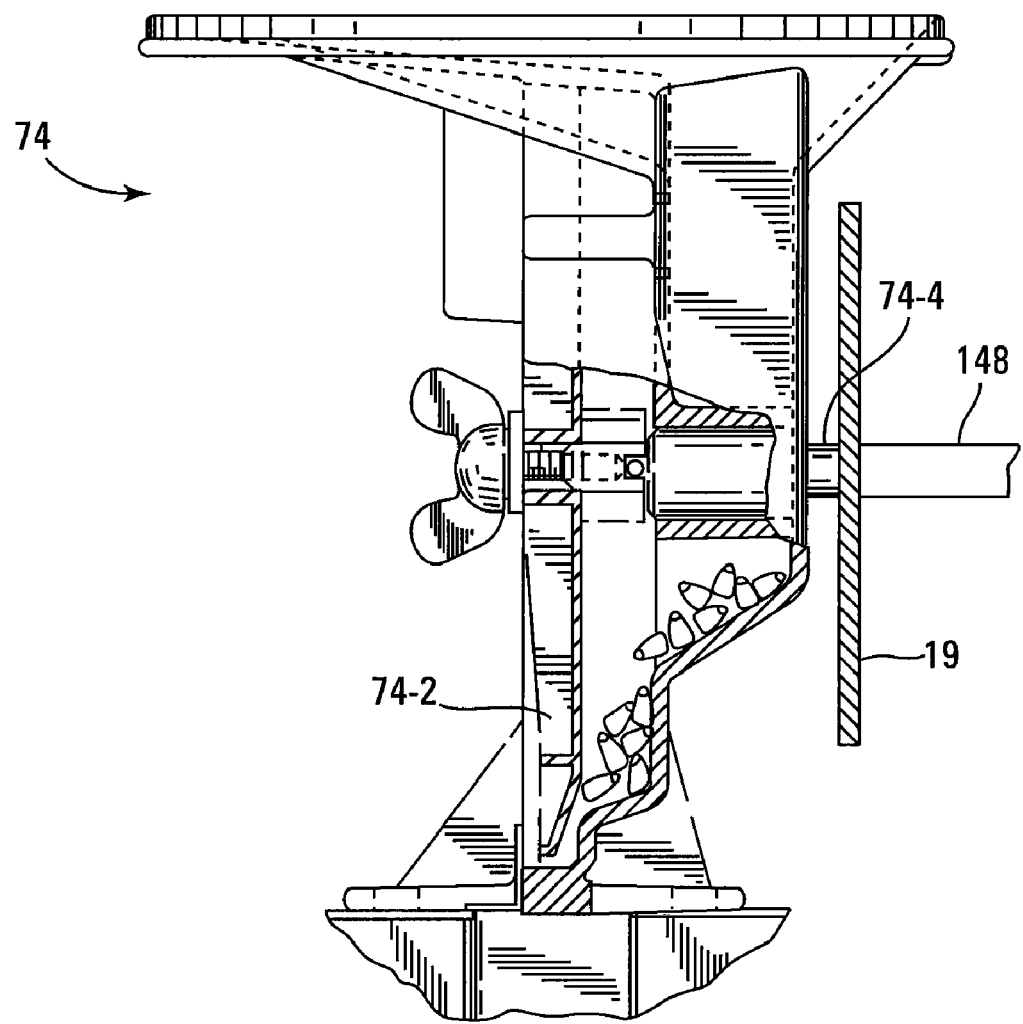
FIG. 12 is a partial sectional side elevation view of a typical positive-air seed meter showing how the meter is operably coupled to the preferred drive system of the apparatus of FIG. 1.

General Operation of the Preferred Embodiment of the Seed Meter Testing Apparatus To test the singulation of a seed meter, the meter desired to be tested is first removed from the planter and preferably cleaned. The meter is then secured to the seed meter mount 19 of the apparatus 10 such that the seeds to be dispensed from the meter will be deposited onto the belt 40, either directly as illustrated in FIG. 1 with the finger pickup meter 70, or indirectly by providing a seed tube 76 as previously discussed to guide the discharged seeds onto the belt 40 as illustrated in FIG. 1 for the vacuum-disc meter 72. The meter's driven shaft 70-4, 72-4, 74-4 is then coupled to the respective shaft 128, 138, 148 of the apparatus 10 (FIGS. 10, 11, 12).

After the seed meter 70, 72, 74 is properly mounted and coupled to the drive system 102, the motor 104 is engaged, causing the belt 40 to move along the track 18 in the direction of arrow 200 as previously described. The drive system 102 also preferably begins to drive the particular seed meter 70, 72, 74 being tested to operate in its normal mode of operation.

The speed of the variable speed motor 104 is adjusted to rotate the seed selection mechanism 70-2, 72-2, 74-2 (FIGS. 10, 11, 12) of the meter 70, 72, 74 at the desired rotational speed to produce the desired seed discharge rate so as to meet the target seed population at which the seed meter 70, 72, 74 is to be tested. It should be understood that the term "seed selection mechanism" as used herein refers to the structure in the various types of meters which performs the function of selecting the seeds from the meter's seed pool or seed reservoir and discharging the seeds from the seed meter at regular intervals. In the case of the finger pickup meter, for example as disclosed in the Hansen '601 patent, incorporated herein by reference, the seed selection mechanism 70-2 (FIG. 10) comprises the plurality of spring biased fingers 70-6 (FIG. 10). In the case of the cavity disc meter, for example as disclosed in the Lodico '233 patent, incorporated herein by reference, the seed selection mechanism refers to the disc or plate having the radially spaced cavities which select and retain the seeds until discharged. In the case of a belt meter, for example as disclosed in the Romans '338 patent, incorporated herein by reference, the seed selection mechanism comprises the cavity belt. In the case of a vacuum disc meter, for example, as disclosed in the Gugenhan '606 patent or the Lundie '909 patent, each incorporated herein by reference, the seed selection mechanism 72-2 (FIG. 11) comprises the vacuum disc in combination with the vacuum source for entraining the seeds on the disc. In the case of a positive-air meter, for examples, as disclosed in the Deckler '979 patent, incorporated herein by reference, the seed selection mechanism comprises the seed disc in combination with the positive-air source.

Figure 13:
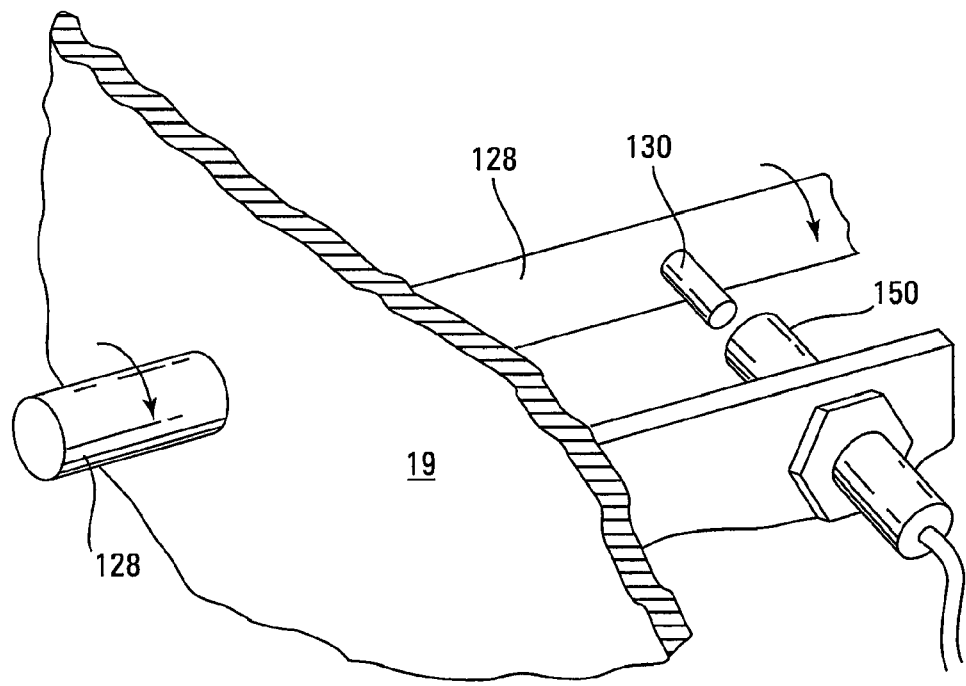
FIG. 13 is a partial perspective view of the preferred lug and rpm sensor of the apparatus of FIG. 1.

As illustrated in FIG. 13, the apparatus 10 preferably includes an rpm sensor 150 to detect the rotational speed of the seed selection mechanism 70-2, 72-2, 74-2 of the seed meter 70, 72, 74 being tested. The preferred rpm sensor 150 is an inductive proximity switch. As previously discussed, the third rotational shaft 128 preferably includes a lug 130. Each time the end of the lug 130 rotates in close proximity past the rpm sensor 150 an electrical signal pulse is generated. As discussed later, the computer 90 receives the electrical pulse signals generated by the rpm sensor 150 upon the passing of the lug 130 at reach revolution of the shaft 128. The revolutions per minute (rpm) of the shaft 128 is preferably displayed on the computer display 94. In the preferred embodiment only one rpm sensor 150 is provided. Thus, it should be appreciated that depending on the size of the gears or sprockets comprising the drive system 102 for rotating the seed selection mechanisms of the other seed meters 72, 74, the rotational speed of the third shaft 128, and thus the seed selection mechanism 70-2 operably coupled thereto, may not be a direct 1:1 ratio as the rotational speed of the fourth and sixth shafts 138, 148 operably coupled to the seed selection mechanisms of the other meters 72, 74. Thus, in the preferred embodiment, a conversion chart may be provided to identify the rotational speed of the other meters 72, 74. It should be appreciated, however, that multiple sensors may be utilized to directly detect the speed of the other seed meter's seed selection mechanisms, or the computer 90 may be programmed to provide any necessary correction factor depending on the meter being tested. Other known or conventional means of detecting and displaying the rpm of a shaft may also be used.

Where the seed meter being tested is a pneumatic meter, an appropriate vacuum source or positive air source is also required. A conduit 152 is provided for communicating the vacuum source or positive air source to the pneumatic meter 72, 74. As discussed in greater detail in the Sauder '071 patent previously incorporated by reference, the conduit 152 preferably includes a manifold with a regulator valve to regulate the amount of vacuum or forced air that will be applied to the meter 72, 74 through the conduit 152. For example, as discussed in the Sauder '071 patent, a regulator valve is slidable with respect to the manifold to open a vent to atmosphere. By increasing and decreasing the vent opening by movement of the valve, the amount of vacuum or forced air applied to the meter through the conduit 152 can be controlled. An appropriate sensor and gauge or display may be provided to detect the amount of vacuum source and/or positive air being supplied to the meter 72, 74.

With the seed meter 70, 72, 74 set to the desired seed discharge rate (and, for the pneumatic meters, the desired amount of vacuum and/or positive air supplied), the testing process is commenced by feeding a quantity of the desired type and variety of seeds to be planted into the seed meter and initiating the appropriate program stored in the computer for the seed meter being tested. The seed meter 70, 72, 74 will begin to discharge seeds in its normal mode of operation at the preselected seed discharge rate onto the moving belt 40.

As previously described, the preferred belt 40 includes a plurality of equidistantly spaced flights 42 which define a plurality of cells 50. Preferably, when testing finger-pickup meters 70 in particular, the flighted belt 40 of the testing apparatus 10 is timed with respect to the seed discharge rate of the seed meter 70 to avoid the discharged seeds 51 falling from the meter 70 and hitting the top of a flight 42 of the belt 40 and being deflected into an adjacent cell 50 resulting in an erroneous "skip" or "multiple" as discussed later. Preferably, the apparatus 10 includes means for adjusting the belt 40 by advancing or reversing the belt 40 as needed such that each cell 50 of the belt 40 is positioned to sequentially receive the discharged seed 51 falling at the preset seed discharge rate from the meter 70. The means for adjusting the timing of the belt 40 may include simply loosening the belt tension assembly 58 and manually advancing or reversing the belt 40 as needed with respect to the sprocket 36. Alternatively, the means for adjusting the timing of the belt 40 may include advancing or reversing the belt 40 with respect to the shaft 128 operably coupled to the seed meter 70 such as by rotating the second shaft 120 with respect to the second chain 118 and/or by advancing the third shaft 128 with respect to the third chain 122, etc.

As the discharged seeds 51 on the belt 40 are advanced in the direction of the path of travel of the belt 40 as indicated by arrow 200, the seeds 51 will roll or slide to the lower side 54 of the cell 50 as the belt 18 passes the canted or twisted section of the upper channel 20 of the track 18 as previously described. Additionally, as each of the cells 50 pass the seed aligning brush 60 any seed multiples within the cells 50 will be swept in alignment along the lower side 54 of the cell 50 as previously described and illustrated in FIG. 3. As the seeds 51 on the belt 40 continue to advance in the direction of the path of travel of the belt 40 as indicated by arrow 200, the seeds 51 and flights 42 are preferably detected by the seed sensor 82 and flight sensor 81, respectively, as described in detail later.

As explained in more detail below, when operating the apparatus 10 to test the singulation of a seed meter, the operator can preferably select the "mode" of operation of the seed meter to be tested such that the operator is provided with particularly relevant information for each of the various different types of meters. For example, the apparatus "Finger Mode" for testing finger-pickup meters; "Cavity Mode" for testing cavity disc meters; "Belt Mode" for testing belt meters; "Pneumatic Mode" for testing vacuum-disc meters or positive-air meters. For purposes of satisfying the written description and enablement requirements of the present application, only an example of a preferred embodiment for "Finger Mode" and "Pneumatic Mode" are provided herein. It being understood however, that other modes of operation are within the scope of the appended claims and that the scope of the present invention should not be construed as being limited to the particular examples of the preferred embodiments of the modes of operation hereinafter provided.

Operating the Apparatus in "Finger Mode"

The following description of the operation of the apparatus 10 of the present invention is particularly directed toward testing finger-pickup meters.

As illustrated in FIG. 10, the finger meter 70 includes a seed selection mechanism 70-2 comprising twelve spring biased seed selecting fingers 70-6 which are removable fixed in relation to the driven shaft 70-4 for rotation therewith by the finger guide 70-8 and locking nut 70-10. The end 70-12 of the driven shaft 70-4 is keyed by a pair of pins 70-14 such that the orientation of the driven shaft 70-4 with respect to the fingers 70-6 is known at all times. The end 129 of the shaft 128 is preferably keyed or otherwise configured, such as by an adapter having a channel 131 to receive the pin 70-14 so that the driven shaft 70-4 and the drive shaft 128 also couple with respect to one another in a known orientation. The orientation of the channel 131 in the end 129 of the drive shaft 128 is also preferably aligned with the lug 130 on the drive shaft 128. As such, with the drive shaft 128 and the driven shaft 70-4 coupled with respect to each other in a known orientation, the position of each of the fingers 70-6 with respect to the pin 70-14 and lug 130 will also be known.

Referring to FIG. 14, a preferred embodiment of the front panel of the computer 90 is shown. As illustrated, the preferred front panel includes twelve columns numbered from one to twelve to correspond to each of the twelve fingers 70-6 of the meter 70. The particular finger 70-6 that is in closest radial alignment with the pin 70-14 (and thus lug 130) is arbitrarily designated as "Finger No. 1." The remaining fingers, proceeding in a clockwise direction, correspond to "Finger No. 2" through "Finger No. 12," respectively. As the meter 70 is driven by engaging the drive system 102 as previously described, each passing rotation of the lug 130 detected by the rpm sensor 150 as the drive shaft 128 rotates, will necessarily correspond to the passing rotation of Finger No. 1. Likewise, because the belt 40 is preferably timed with respect to the seed discharge rate, each cell 50 of the belt 40 will correspond to a known one of the twelve fingers 70-6. As such, the passing of a cell 50 past the flight sensor 81 will likewise correspond to a known finger 70-6. Thus, upon passing of a cell 50 past the flight sensor 81, the presence of a seed within a cell 50, or the absence of a seed within a cell (i.e. a "skip"), or the presence of multiple seeds within a cell (i.e. a "multiple") as detected by the seed sensor 82 can be associated with the corresponding finger 70-6.

With the meter 70 coupled to the drive system 102 as described above, the drive system 102 is engaged. The speed of the motor 104 is adjusted to rotate the shaft 128 at the desired speed to produce the desired seed discharge rate to achieve the target seed population. The computer 90 is turned on by pressing the "Power On/Off" button 202 (FIG. 14). The operator then presses the "Mode" button 204 to step through the above-identified preprogrammed modes until Finger Mode appears in the display 94. The "Test Settings" button 206 is then pressed to set the number of cells 50 desired for the test run (i.e., the "Run Size"). Preferably, upon pressing the Test Settings button 206, the Run Size 218 can be set by pressing the up arrow ("▲") 208 and/or down arrow ("▼") 210 to step through preset Run Size increments (e.g., 50 or 100 cell increments) until the desired Run Size 218 appears in the display (e.g., "2000 cells").

After the test parameters are specified, the test run can be initiated by pressing the "Start/Stop" button 212. Upon pressing the Start/Stop button 212, the "Run No." 215 will increment to the next sequential integer and the computer will start recording the number of cells 50 passing the flight sensor 81. Prior to pressing the Start/Stop button 212 to commence the test run, the seed meter reservoir should be filled with seeds and the meter 70 should be allowed to run for a sufficient period of time until the first seed 51 discharged by the meter 70 onto the belt 40 passes the seed sensor 82, otherwise, the computer 90 will start recording erroneous skips in the passing cells as hereinafter described.

As illustrated in FIG. 14, after pressing the Start/Stop button 212, the computer 90 preferably begins recording the number of skips ("No. of Skips") 217 and the number of multiples ("No. of Multiples") 219 detected by the sensor 82 in each passing cell 50. In the preferred embodiment, the number of skips and number of multiples detected are registered in real time on the display 94 under the appropriate column for the corresponding finger (Finger No. 1 through Finger No. 12). In addition, as shown in FIG. 14, the computer 90 also preferably calculates and registers on the display 94, in real time, the total number of skips ("Total Skips") 220 detected in the run and the total multiples ("Total Multiples") 222 detected in the run by adding the number of skips 217 and multiples 219, respectively, detected for each finger 70-6.

The computer preferably calculates and registers, in real time, the percentage of skips ("% Skips") 226, the percentage of multiples ("% Multiples") 228, and the percentage of singulation ("% Singulation") 230 based upon a fifty cell moving average. Thus, until the Run Size is complete or until the Start/Stop button is pushed, the % Skips 226 is calculated by dividing the Total Skips 220 by fifty cell increments and multiplying the quotient by 100%. Similarly, % Multiples is calculate dividing the Total Multiples by fifty cell increments and multiplying the quotient by 100%. The real time % Singulation is calculated by recording the number of cells containing only one seed 51 and dividing that number by the total number of cells in fifty cell increments and then multiplying the quotient by 100%. Additionally, the computer preferably registers the number of times a rollover ("Rollovers") occurs in a run. A Rollover is registered when a skip is immediately followed by a double, which indicates that a seed 51 on the belt 40 has rolled over into the next cell 50. The number of Rollovers will indicate if the belt 40 is not properly timed with respect to the seed discharge rate, resulting in the discharged seeds hitting a flight 42 and bouncing or being deflected into the next cell 50 as previously discussed.

If the Start/Stop button is pushed during the test run before the Run Size 218 is reached, the computer will cease recording signals from the sensors 81, 82 and the display will test results with respect to % Skips 226, % Multiples 228 and % Singulation 230 will be based on the actual seed count recorded at the time the Start/Stop button 212 is pushed. If the test is allowed to run until the cell count equals the preset Run Size 218, the % Skips 226, % Multiples 228, % Singulation 230 will be calculated based on the actual number of seeds counted during the completed run. Preferably, upon completion of the run, the test data is automatically stored in memory. Similarly, whenever the Start/Stop button 212 is pushed, the computer preferably stores the data for that run into memory and advances the "Run No." 215 value to the next sequential integer. Preferably, the computer 90 includes a printer port, such as a DB9 or an RS232 port (not shown) for connecting to a printer (not shown) and the user interface 92 includes a "Print" button 214 which dumps the current Run No. data to the printer. Any desired previous Run No. 215 can preferably be recalled from memory by pressing the up and down arrows 208, 210 to select the desired run number 215.

Figure 16:
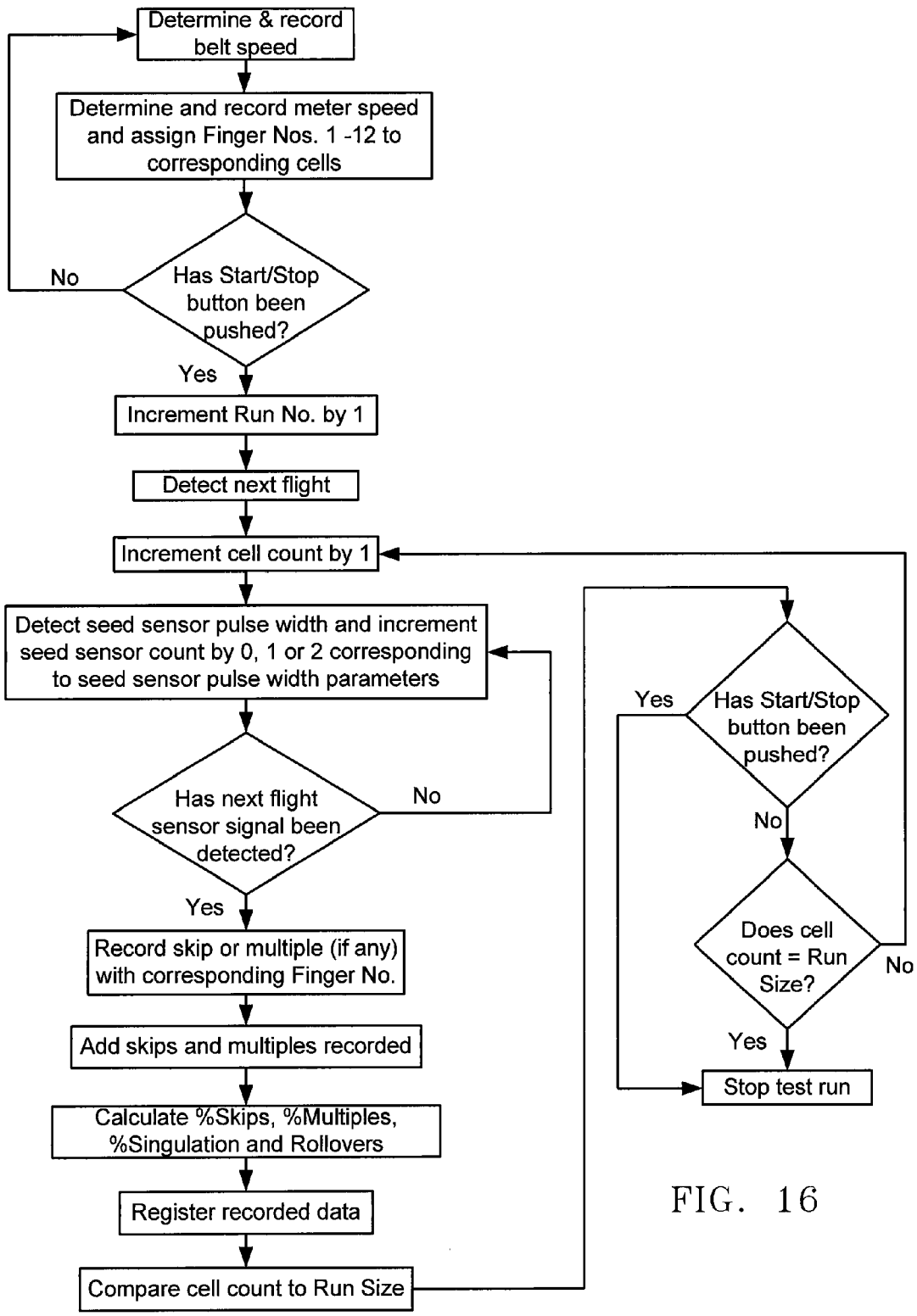
FIG. 16 is a flow chart of the preferred steps performed during seed meter testing operations in Finger Mode.

FIG. 16 is a flow-chart identifying the preferred steps or logic performed when operating under Finger Mode. In operation, upon pressing the Power On button 202 (FIG. 14) the computer preferably begins recording the signal pulse 300 detected upon the passing of each flight 42 past the flight sensor 81. Using the frequency of the signal pulses 300 the belt speed can be calculated by dividing the known distance between flights 42 (e.g., 1.56 inches) by the time (in seconds) recorded between signal pulses 300. Additionally, upon Power On, the computer preferably begins recording the signals generated by the rotation of the lug 130 past the rpm sensor 150. Based on the frequency of the signals generated by the rpm sensor 150, the rotational speed in revolutions per minute (rpm) or revolutions per seconds (rps) of the shaft 128 and the seed selection mechanism 70-2 coupled thereto can be determined. Preferably the computer registers on the display 94 the rotational speed (".RPM") 216 (FIG. 14) of the seed selection mechanism 70-2 . With the rotational speed of the seed selection mechanism determined, the seed discharge rate in seeds per second is known by dividing the shaft speed (rps) by the number of fingers 70-6 (i.e., 12) in the finger meter 70. As previously discussed, if the belt 40 is properly timed with the seed discharge rate such that each successive cell 50 is positioned to receive each sequentially discharged seed 51, each of the cells 50 will correspond with a known one of the fingers 70-6. As previously discussed, to associate or assign a particular finger 70-6 with a particular cell, the computer 90 preferably assigns or associates the Finger No. 1 position with the pulse signal generated by the pin 130 passing the rpm sensor 150.

Upon pressing the Start/Stop button 212, the computer preferably increments the Run No. 215 to the next sequential number and begins tracking the number of cells 50 passing the flight sensor 81. The computer will continue counting the passing cells 50 and comparing the cell count to the Run Size 218 until the cell count equals the Run Size 218 or until the operator terminates the run by pressing the Start/Stop button 212, at which point the computer preferably stops recording any further signal pulses 300, 302 from the flight sensor 81 or seed sensor 82.

In addition upon pressing the Start/Stop button 212, the computer preferably starts recording the pulse signals 302 generated by the seed sensor 82. Preferably, so that the pulse signals 302 generated by the passing of the flight 42 past the seed sensor 82 is not erroneously recorded as a seed, the computer is preferably programmed to discount any seed sensor pulse signal 302 or any portion of a seed sensor pulse signal 302 that corresponds to the passing of a flight 42. In the preferred embodiment, because the distance between the flight sensor 81 and the seed sensor 82 is preferably substantially equal to the distance between the flights 42 of the belt 40, the computer can be programmed to ignore or block signals from the seed sensor 82 upon the detecting the initial "go-high" phase of the flight sensor pulse signal 300 for a distance substantially equal to the thickness of the flight 42 (e.g. 0.3 inches). Other means of discounting signal pulses 302 or a portion of the signal pulse 302 associated with the passing of a flight 42 may include distinguishing between the signal pulses 300, 302 of the flight sensor 81 and seed sensor 82 by time or by differences in signals or by providing sensors and/or software to distinguish between a passing flight and a passing seed.

In the preferred embodiment, the computer is preferably programmed so that if the width of the signal pulse 302 generated by the seed sensor 82 is less than a predefined minimum pulse width (e.g., 0.075 inches), such pulses 302 are ignored as being associated with the detection of erroneous debris on the belt 40. Further, the computer is preferably programmed so that if the width of the signal pulse 302 of the seed sensor 82 is greater than a predefined maximum pulse width (e.g., 0.500 inches) (discounting any portion of a pulse signal corresponding to a passing flight), the resulting pulse is recorded as a "double" or two seeds. All other signal pulses 302 generated by the seed sensor 82 that have a pulse width between the predefined minimum and maximum (taking into account any discounted portion of the signal pulse 302 corresponding to the passing of a flight) are recorded as a "single" or one seed.

The computer preferably continues to increment the seed count detected until the computer receives the next pulse signal 300 from the flight sensor 81. At which time, the number of recorded seeds for the cell (i.e., the number of pulses recorded corresponding to a "single" (if any) plus the number of pulses corresponding to a "double" (if any)) detected between consecutive pulse signals 300 of the flight sensor is added and recorded. If the sum of recorded seeds counted between successive flight sensor pulse signals 300 is greater than one, the program records a "multiple" for that cell. If the number of recorded seeds counted between two successive flight sensor pulse signals 300 is zero, the program records a "skip" for that cell 50. If the cell count is less than the preset Run Size 218, the program repeats the above steps.

Preferably, as previously described, after a predefined minimum number of cells pass (e.g., fifty cells) the above recorded data is dumped from the computer's memory to the display 94, whereby any skips and multiples recorded for a cell is registered on the display 94 under the corresponding finger number (Finger No. 1–12) assigned to or associated with that cell. Preferably, also as previously described, the program thereafter calculates the Total Skips 220, Total Multiples 222 and Rollovers 224 and registers this data on the display 94 in real time during the test run. Furthermore, as previously described, the program thereafter preferably begins to calculate the % Skips 226, % Multiples 228 and % Singulation 230 based on a fifty cell moving average and registers these values on the display 94 in real time during in the test run. As previously identified, when the cell count equals the Run Size 218, or when the Stop/Start button 212 is pushed, the computer stops recording any further signals 300, 302 from the sensors 81, 82 and calculates the foregoing data based on the actual number of seeds detected up through that point in time.

It should be appreciated that the computer may be programmed to "learn" the seed size being tested such that the computer automatically defines the minimum pulse width required for recording a seed sensor signal pulse 302 as a "single" and the maximum pulse width required for recording a signal pulse 302 as a "double." Thus, rather than preprogramming the computer to ignore signals generated by the seed sensor 82 having a pulse width less than 0.075 inches as identified by way of example above, the computer may be programmed to "learn" its own minimum pulse width based upon a sample of a predefined number of seeds (e.g., 200 seeds). Under such an embodiment, the data preliminary recorded for the run (i.e., the number of skips, multiples, etc.) will be based on a predefined minimum pulse width until such time as the program "learns" the seed size to calculate a more appropriate minimum pulse width. At which time, after the program calculates and sets the actual minimum pulse width upon which it will finally base the testing data, the program preferably re-assesses the preliminary data recorded in memory for the seeds comprising the preliminary sampling. Any changes to the preliminary data (i.e., skips, multiples, etc.) based on the new "learned" minimum pulse width will be revised prior to being registered on the display 94. The same process may be used for "learning" the pulse width defining a double. By programming the computer to "learn" the seed size, more accurate seed count and % Singulation will be obtained when using the apparatus to test seed meters for different types of seeds. For example, programming the computer to record a double when the pulse width is 0.5 inches may be appropriate for accurately identify doubles when testing large, flat corn seed. However, when testing the same or a different seed meter with soybeans, a pulse width of 0.5 inches may not accurately identify doubles.

Operating the Apparatus in "Pneumatic Mode"

The following description of the operation of the apparatus 10 of the present invention is particularly directed toward testing vacuum-disc meters 72 as previously identified.

As illustrated in FIG. 11, the vacuum-disc meter 72 includes a seed selection mechanism 72-2 comprising a rotatable vacuum disc 72-6 which rotates about driven shaft 72-4. The vacuum disc 72-6 has a plurality of radially spaced apertures 72-8 over which seeds are entrained due to the pressure differential created by the vacuum source (not shown) as more thoroughly explained in the Gugenhan '606 patent and/or the Lundie '909 patents previously incorporated herein by reference. As previously described, the driven shaft 72-4 is coupled to the drive shaft 138. However, unlike with the finger-meter 70, due to the nature of pneumatic meters, knowing the particular position or orientation of the seed selection mechanism 72-2 is generally not necessary to identify or correct a problem with the seed selection mechanism. Rather, if the test results reveal excessive skips or multiples that are attributable to the vacuum disc, as opposed to a worn seal, or improper adjustment of the vacuum, improperly adjusted seed stripper, etc., visual inspection of the disc will generally reveal the problem (such as a blocked or worn aperture). In which event, the operator can attempt to remove the blockage or, if necessary, replace the disc.

Figure 15:
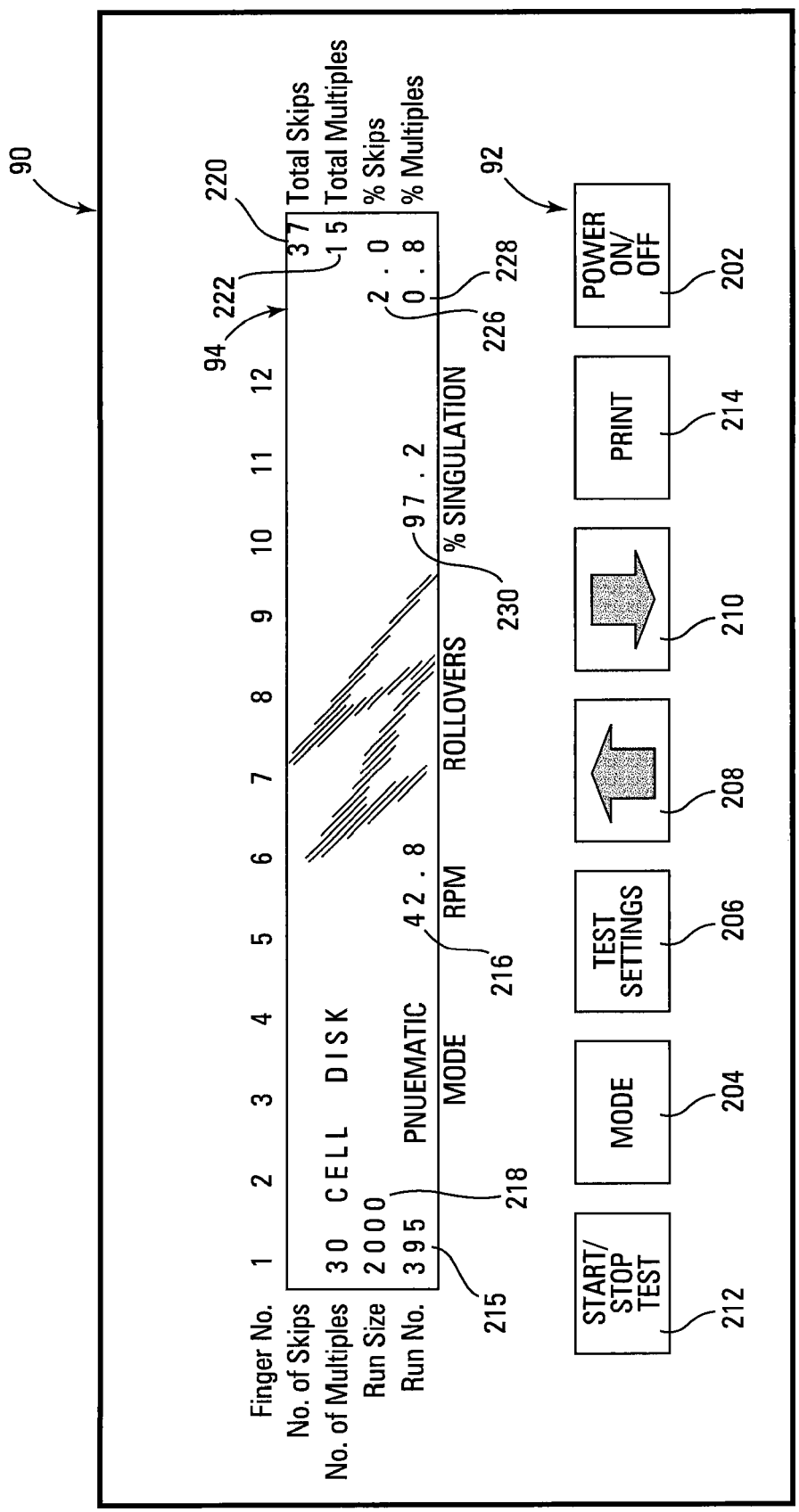
FIG. 15 is a top plan view of the preferred computer showing the preferred display and sample data in Pneumatic Mode.

Referring to FIG. 15, after the driven shaft 72-4 is properly coupled to the drive shaft 138, the desired amount of vacuum source is supplied to the meter 72 by connecting the conduit 152 to the meter's vacuum port 72-10 and adjusting an appropriate vacuum regulator or valve as previously described. With the meter 72 coupled to the drive system 102, and the desired amount of vacuum source supplied to the meter 72, the drive system 102 is engaged. The speed of the motor 104 is adjusted to rotate the shaft 138 at the desired rpm to produce the target seed discharge rate. The computer 90 is turned on by pressing the Power On/Off button 202. The operator then presses the "Mode" button 204 to step through the preprogrammed modes until Pneumatic Mode appears in the display. The Test Settings button 206 is then pressed to step through the parameters that need to be specified to perform the test under Pneumatic Mode. Preferably, upon pressing the Test Settings button 206, the Run Size number 218 is adjusted by pressing the up and/or down arrows 208, 210 until the desired Run Size 218 is displayed (e.g., "2000 cells"). Upon pressing the Test Settings button 206 a second time, the operator can preferably specify the number of apertures or cells in the vacuum disc being tested (i.e. disc apertures or cavities) by pressing the up and down arrows. For the reasons identified below, specifying the number of apertures 72-8 in the disc 72-6 is used to calculate the theoretical seed discharge rate ("TSDR").

After the test parameters are specified, the test run can be initiated by pressing the Start/Stop button 212. Upon pressing the Start/Stop button 212 the Run No. 215 will increment to the next sequential integer and the computer will start recording the number of cells passing the flight sensor 81. Note, as before, the meter 72 should be allowed to operate for a sufficient period of time until the first seed 51 discharged by the meter 72 onto the belt 40 passes the seed sensor 80. Failure to do so will result in the computer recording erroneous skips in the test run. When the cell count equals the predefined Run Size 218, the test run automatically stops. However, as before, the test can be stopped prematurely by pressing the Start/Stop button 212 as previously discussed.

It should be appreciated that other than finger-pickup meters, it is generally not practical or necessary to attempt to time the seed discharge rate with a passing cell. As such, for all other non-finger pickup meters, identifying skips and multiples in a particular cell may not accurately reflect the actual singulation of the meter. Accordingly, an alternative means of detecting skips and multiples is preferably provided when testing all non-finger pickup meters with the apparatus 10 of the present invention.

In the preferred embodiment, all non-finger pickup meters are disposed over a tube or boot 76 which includes a photoelectric sensor 78 of the type currently found on most seed tubes of conventional agricultural planters. The tube sensor 78 is disposed within the tube 76 to detect seeds discharged from the seed meter 72 before the seeds reach the belt 40. As with the other sensors, 81, 82, 150, the tube sensor 78 is electrically coupled to the computer and generates signal pulses upon detecting the passing of a seed through the tube 76.

Figure 17:
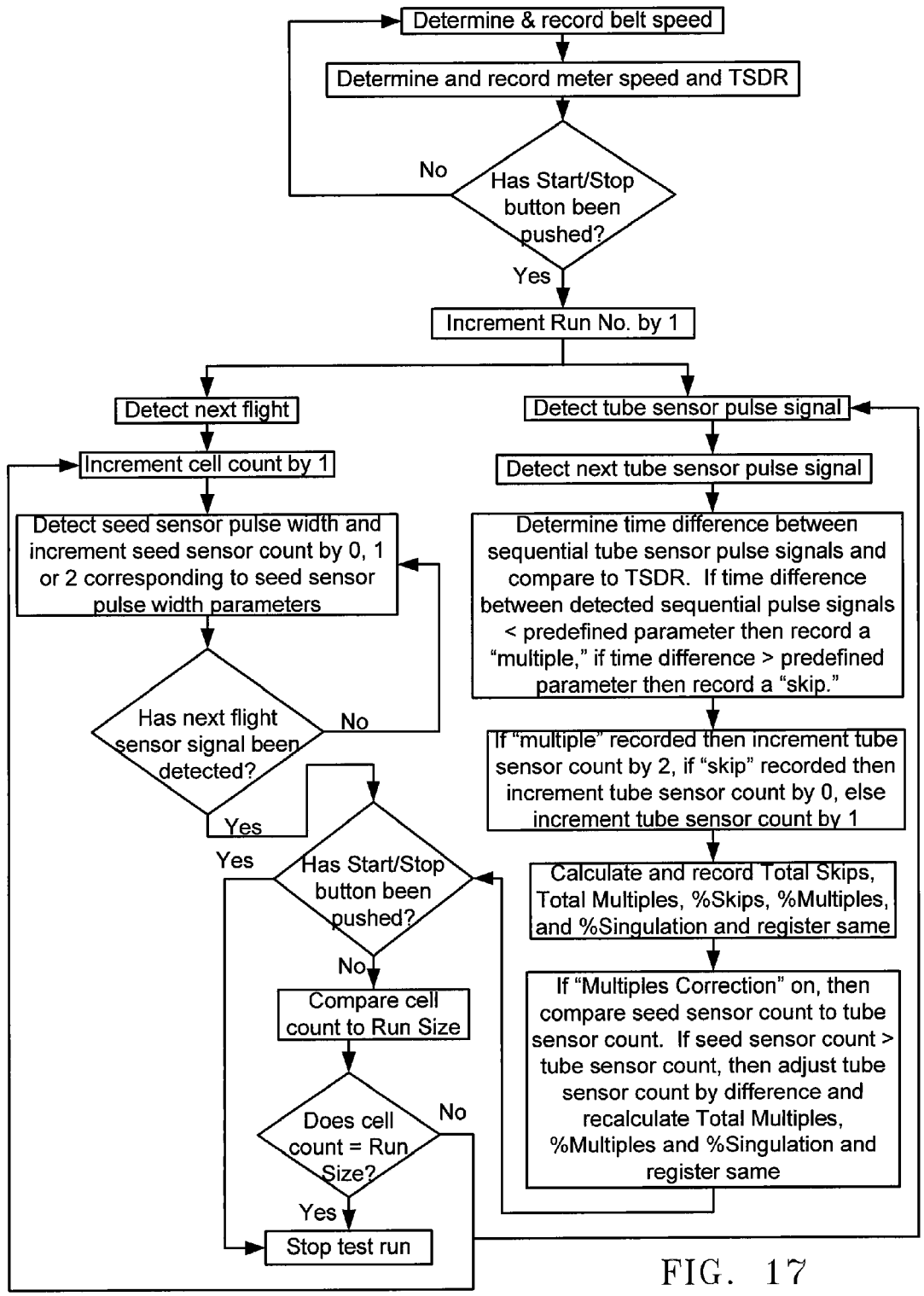
FIG. 17 is a flow chart of the preferred steps performed during seed meter testing operations in Pneumatic Mode.

FIG. 17 is a flow-chart identifying the preferred steps or logic of the computer program when operating under Pneumatic Mode. In operation, upon pressing the Power On button 202 (FIG. 15) the computer preferably begins recording the signal pulse 300 detected upon the passing of each flight 42 past the flight sensor 81. Using the frequency of the signal pulses 300 the belt speed can be calculated by dividing the distance between flights 42 (e.g., 1.56 inches) by the time (in seconds) recorded between signal pulses 300. Additionally, upon Power On, the computer preferably begins recording the pulse signals generated by the rotation of the lug 130 past the rpm sensor 150. Based on the frequency of the signals generated by the rpm sensor 150, the rotational speed in revolutions per minute (rpm) or seconds (rps) of the seed selection mechanism 72-2 can be determined. Preferably the computer registers the rotational speed ("RPM") 216 of the seed selection mechanism 72-2 on the display 94. With the rotational speed of the seed selection mechanism determined, the theoretical seed discharge rate ("TSDR") in seeds per second can be calculated by dividing the rotational speed 216 of the seed selection mechanism 72-2 by the number of apertures 72-8 in the disc 72-6 specified during setup.

Upon pressing the Start/Stop button 212, the computer preferably increments the Run No. 215 to the next sequential number and begins tracking the number of cells 50 passing the flight sensor 81. The computer will continue counting the passing cells 50 and comparing the cell count to the Run Size 218 until the cell count equals the Run Size or until the operator terminates the run by pressing the Start/Stop button, at which point the computer preferably stops recording any further signal pulses 300, 302 from the flight sensor 81 or seed sensor 82.

In operation, after pressing the Start/Stop button, the computer begins recording the signal pulses generated by the tube sensor 78 upon detecting of seeds 51 discharged by the meter 72. The computer preferably increments the seed count upon each tube sensor signal pulse generated. The time between detected seeds (i.e. the detected seed discharge rate ("DSDR")) is also preferably tracked. The computer preferably compares the DSDR against the TSDR. If the actual time between successive detected seeds is greater than or less than the time period when a seed should have been detected based on the TSDR, the computer preferably records this time difference. If the actual difference in time between signals of two successive discharged seeds is greater than a predefined maximum time difference (e.g., 165% of theoretical time between seeds based on the TSDR), the computer preferably records a "skip." Alternatively, if the actual time between successive detected seeds is less than a predefined minimum time difference (e.g., 35% of the theoretical time between seeds based on the TSDR), a "multiple" is recorded. A time difference between successive discharged seeds between the predefined maximum and minimum time differences based on the TSDR are recorded as a single.

Preferably, as previously described, after a predefined minimum number of cells pass (e.g., fifty cells), the computer calculates the Total Skips 220 and Total Multiples 222 and thereafter registers this data on the display 94 in real time during the test run. Furthermore, as previously described, the program thereafter preferably begins to calculate the % Skips 226, % Multiples 228 and % Singulation 230 based on a fifty cell moving average and registers these values on the display 94 in real time during in the test run. When the cell count equals the Run Size 218, or when the Stop/Start button 212 is pushed, the computer stops recording any further signals 300, 302 from the sensors 81, 82 and calculates the foregoing data based on the actual number of seeds detected up through that point in time.

In addition upon pressing the Start/Stop button 212, the computer starts recording the pulse signals 302 generated by the seed sensor 82. As previously described under Finger Mode, so that the pulse signals 302 generated by the passing of the flight 42 past the seed sensor 82 is not erroneously recorded as a seed, the computer is preferably programmed to discount any seed sensor pulse signal 302 or any portion of a seed sensor pulse signal 302 that corresponds to the passing of a flight 42. The computer also preferably records the seed count detected in each cell as previously discussed under Finger Mode. Also as previously described under Finger Mode, under Pneumatic Mode the computer may be programmed to "learn" the seed size being tested such that the computer defines the minimum pulse width required for recording a "single" and the maximum pulse width required for recording a "double" by the seed sensor.

Preferably, the computer compares the number of seeds counted on the belt 40 against the number of seeds counted by the tube sensor 78. If the number of seeds counted by the seed sensor 82 is greater than the number of seeds detected by the tube sensor 78, it is preferably assumed that the difference in seed count is a result of the tube sensor 78 failing to recognize the passing of a double. Accordingly, any such difference in seed count between the tube sensor count and seed sensor count is preferably added to the tube sensor count. The Total Multiples, % Multiples and % Singulation is preferably adjusted accordingly. Preferably the operator is given the choice during the set up phase as to whether he/she wishes to have the computer perform the foregoing "Multiples Correction" step. If the operator does not wish to the computer to perform the Multiples Correction, the Total Multiples, % Skips, % Multiples and % Singulation data is preferably based on the signals generated by the tube sensor 78 alone.

Although the foregoing description of the operation of the apparatus 10 in Pneumatic Mode was particularly directed toward vacuum disc type meters, such as disclosed in the Gugenhan '606 patent and/or the Lundie '909 patents, the same setup and operation of the apparatus may be used for positive air meters 74 such as disclosed in the Deckler '979 patent. Additionally, as previously identified, it should be appreciated that in addition to Finger Mode or Pneumatic Mode, the computer may be programmed to record and/or register data particularly applicable to other types of meters, but it is contemplated that Pneumatic Mode may be used for any other types of meters including cavity disc meters such as disclosed in the Lodico '233 patent and belt meters, such as disclosed in the Romans '338 patent.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

The invention claimed is:

1. A method of testing seed singulation of a seed meter, said method comprising;
   a. providing a continuous belt having a plurality of substantially equidistantly spaced cells, each cell defined by a leading and a trailing flight;
   b. providing a seed meter to be tested, said seed meter having a seed selection mechanism for selecting and discharging seeds supplied to said seed meter;
   c. disposing said seed meter to be tested with respect to said continuous flighted belt such that said seeds to be discharged by said seed meter are operably dispensed onto said continuous flighted belt;
   d. driving said seed meter to discharge seeds supplied to said seed meter at a substantially uniform predetermined seed discharge rate;
   e. driving said continuous flighted belt at a substantially uniform, predetermined rate of speed;
   f. detecting said discharged seeds on said continuous flighted belt passing a first point disposed along a path of travel of said continuous belt, including generating a first signal corresponding to each flight passing said first point and recording said generated first signal.

2. The method of claim 1 wherein said step of detecting said discharged seeds includes generating a second electrical signal corresponding to at least one seed passing said first point between successive first signals and recording said generated second signal.

3. The method of claim 2 wherein said step of detecting said discharged seeds includes comparing a pulse width of said second signal to a defined maximum pulse width and a defined minimum pulse width, whereupon if said second signal pulse width is greater than said defined maximum pulse width, the second signal is recorded as two seeds, and whereupon if the second signal pulse width is less than a defined minimum pulse width said second signal is recorded as zero seeds, and whereupon any second signal pulse widths between said defined maximum and minimum pulse widths are recorded as one seed.

4. The method of claim 3 further including recording a seed multiple if more than one seed is detected in said cell and recording a seed skip if less than one seed is detected in said cell.

5. The method of claim 4 further including recording a seed sensor count by adding each said detected seeds in each said passing cells.

6. The method of claim 5 wherein said defined maximum pulse width and said defined minimum pulse is determined automatically by a computer based upon a sampling of discharged seeds passing said first point.

7. The method of claim 6, wherein said seed selection mechanism comprises a known plurality of seed selecting fingers.

8. The method of claim 7 further including, correlating a first one of said known plurality of seed selecting fingers in relation to one of said plurality of cells of said continuous flighted belt, such that each of said cells passing said first point corresponds to a known one of said plurality of seed selecting fingers.

9. The method of claim 8 further including registering on said computer display each multiple and each skip detected under an associated finger number.

10. The method of claim 9 further including adding said skips and multiples detected under each said finger number and registering the same on said computer display, respectively, as total skips and total multiples.

11. The method of claim 10 further including calculating the skips and multiples detected as a percentage of seed sensor count and registering the same on said computer display.

12. The method of claim 11 further including calculating percent singulation of a run based on said detected skips and multiples and said seed sensor count and registering same on said computer display.

13. The method of claim 5 further including providing a tube sensor to generate a third signal upon the passing of said discharged seeds past a second point before said seeds are dispensed onto said flighted belt, thereby defining a detected seed discharge rate.

14. The method of claim 13 further including calculating a theoretical seed discharge rate and comparing said theoretical seed discharge rate to said detected seed discharge rate, whereupon if a time interval between said successively generated third signals is greater than a defined maximum time interval, a skip is recorded by said computer, and whereupon if said time interval between said successively generated third signals is less than a defined minimum, a double is recorded by said computer, and whereupon if said time interval between said successively generated third signals is between said defined maximum and minimum time intervals, a single is recorded by said computer.

15. The method of claim 14 further including generating a tube sensor count by adding one for each single detected by said tube sensor and adding two for each multiple detected by said tube sensor.

16. The method of claim 15 further including comparing said tube sensor count to said seed sensor count, whereupon if said seed sensor count is greater than said tube sensor count, the difference is added to said tube sensor count.

17. The method of claim 16 wherein said defined maximum pulse width and said defined minimum pulse of said seed sensor for determining said seed sensor count is determined automatically by a computer based upon a sampling of discharged seeds passing said first point.

18. In combination, a seed meter to be tested and an apparatus for testing singulation of the seed meter, the apparatus comprising:
   a. a frame supporting a track;
   b. a continuous belt supported by said track, wherein said continuous belt includes a plurality of substantially equidistantly spaced cells, each cell defined by a leading and a trailing flight;
   c. a drive operably coupled to said continuous flighted belt for driving said flighted belt at a desired, substantially uniform, belt speed, said drive further operably coupled to the seed meter for operably driving the seed meter at a desired, substantially uniform, theoretical seed discharge rate, such that seeds supplied to the seed meter are discharged from the seed meter onto said driven continuous flighted belt;
   d. a sensor disposed along a path of travel of said continuous flighted belt for detecting discharged seeds within a cell passing a first point along said path of travel of said continuous flighted belt;
   e. a computer electrically coupled to said sensor to record said detected discharged seeds; wherein said sensor generates a first signal upon the passing of each of said flights past said point and wherein said sensor generates a second signal upon at least one said discharged seed passing said first point between successive first signals.

19. The apparatus of claim 18 wherein a portion of said continuous flighted belt is canted for a distance along said path of travel such that said belt slopes transversely with respect to said path of travel prior to said sensor so as to cause said discharged seeds to be positioned to one side of said belt.

20. The apparatus of claim 19 further including a seed aligning brush disposed along said path of travel of said belt and prior to said sensor to brush said discharged seeds to one side of said belt.

21. The apparatus of claim 20 wherein said sensor comprises a flight sensor and a seed sensor.

22. The apparatus of claim 21 wherein the computer includes a user interface and a display.

23. The apparatus of claim 22 wherein the computer registers percent singulation for said run on said display.

24. The apparatus of claim 23 wherein the mechanical meter is a finger-pickup meter having a seed selection mechanism comprising a plurality of seed selecting fingers.

25. The apparatus of claim 24 wherein said seed selection mechanism is operably coupled in removably fixed relation to said drive such that each cell of said flighted belt is known to correspond with a known one of said plurality of seed selecting fingers.

26. The apparatus of claim 25 wherein the computer registers on said display skips and multiples detected in a run for each one of said known plurality of seed selecting fingers.

* * * * *